No. 716,052.  
C. W. KENNEDY.  
SHEET METAL BENDING MACHINE.  
(Application filed Mar. 30, 1899.)

Patented Dec. 16, 1902.

(No Model.)  
3 Sheets—Sheet 1.

WITNESSES  
Fenton S. Belt,  
R. B. Cavanagh

INVENTOR  
Charles W. Kennedy  
by  
H. W. Bliss, att.

THE NORRIS PETERS CO., PHOTO-LITHO., WASHINGTON, D. C.

No. 716,052.

C. W. KENNEDY.
SHEET METAL BENDING MACHINE.
(Application filed Mar. 30, 1899.)

Patented Dec. 16, 1902.

(No Model.)

3 Sheets—Sheet 2.

WITNESSES
Fenton S. Belt,
R. B. Cavanagh

INVENTOR
Charles W. Kennedy,
by
H. H. Blair
atty

No. 716,052. Patented Dec. 16, 1902.
C. W. KENNEDY.
SHEET METAL BENDING MACHINE.
(Application filed Mar. 30, 1899.)
(No Model.)
3 Sheets—Sheet 3.

WITNESSES
Fenton S. Belt
R. B. Cavanagh

INVENTOR
Charles W. Kennedy
by
H. H. Bliss
atty.

UNITED STATES PATENT OFFICE.

CHARLES W. KENNEDY, OF RUTLEDGE, PENNSYLVANIA, ASSIGNOR TO ELECTRIC POWER DEVELOPMENT COMPANY, OF PHILADELPHIA, PENNSYLVANIA, A CORPORATION OF NEW JERSEY.

SHEET-METAL-BENDING MACHINE.

SPECIFICATION forming part of Letters Patent No. 716,052, dated December 16, 1902.

Application filed March 30, 1899. Serial No. 711,153. (No model.)

*To all whom it may concern:*

Be it known that I, CHARLES W. KENNEDY, a citizen of the United States, residing at Rutledge, in the county of Delaware and State of Pennsylvania, have invented certain new and useful Improvements in Sheet-Metal-Bending Machines, of which the following is a specification, reference being had therein to the accompanying drawings.

Figure 1:
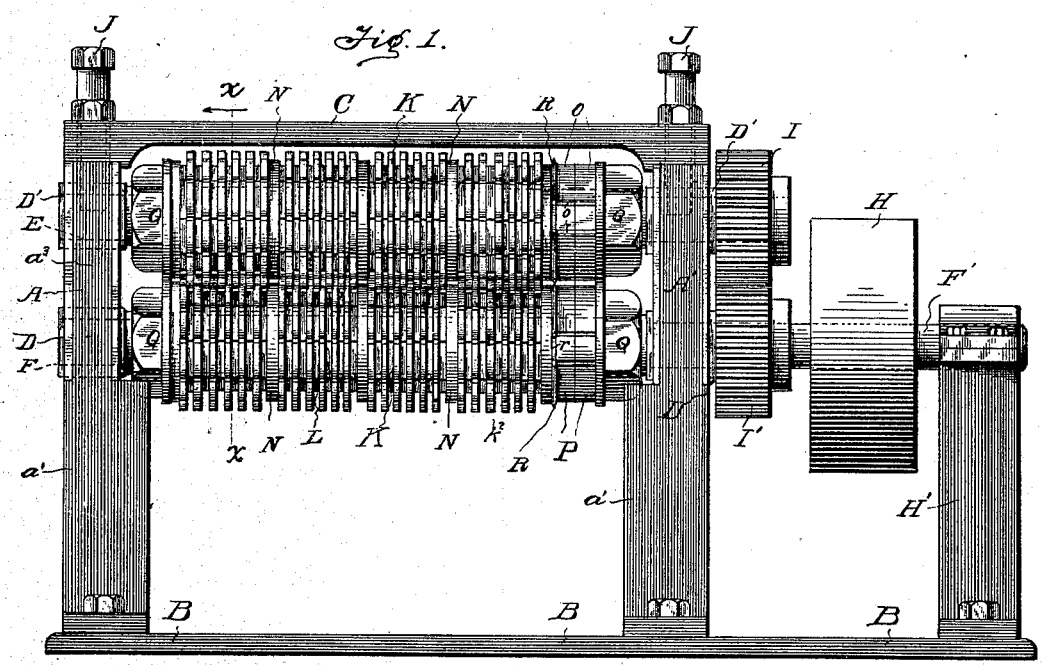
Figures 2, 3:
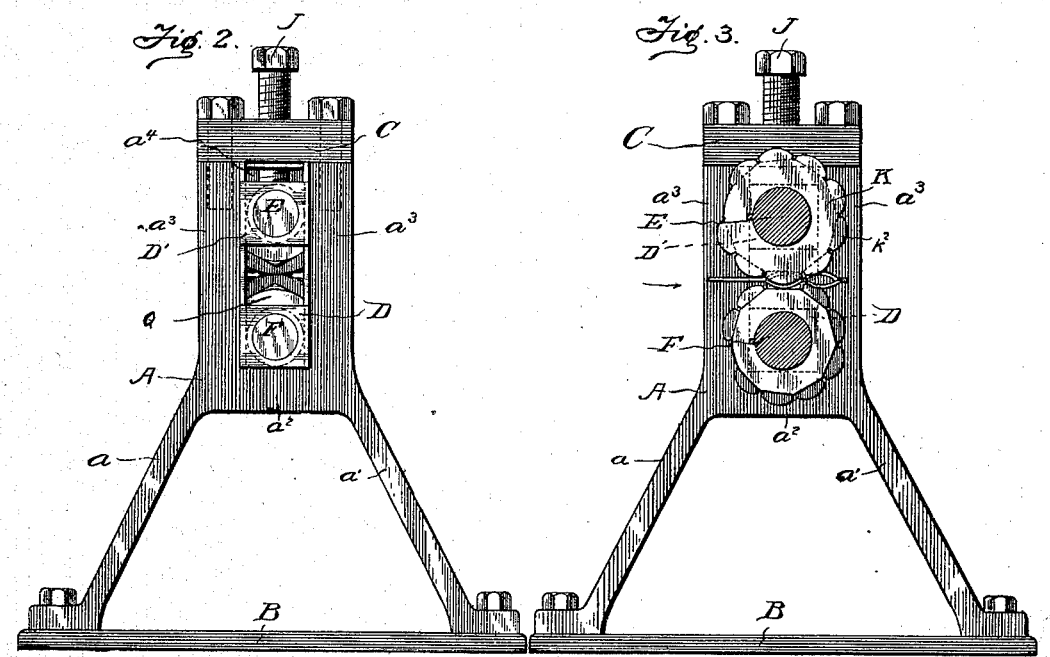
Figure 4:
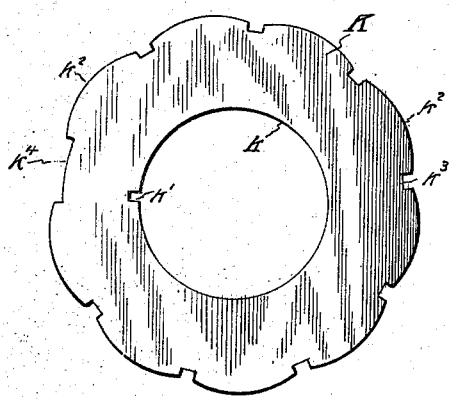
Figure 5:
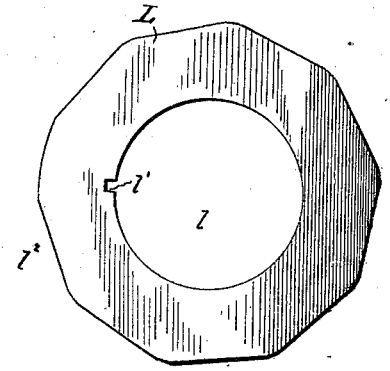
Figure 6:
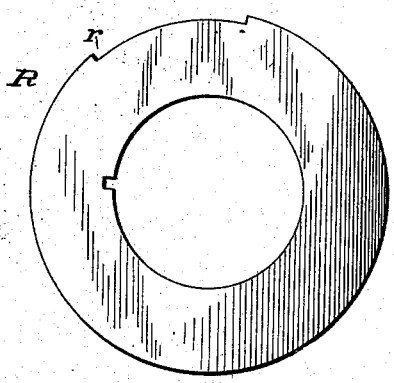
Figure 7:
Figure 8:
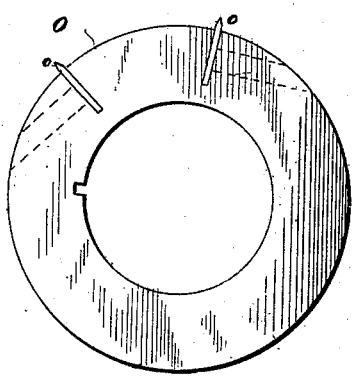
Figure 9:
Figure 11:
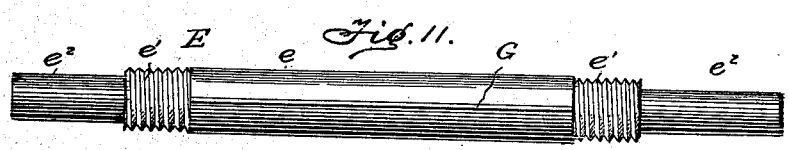
Figure 10:
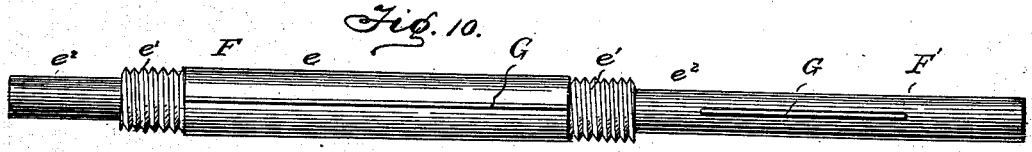
Figure 12:
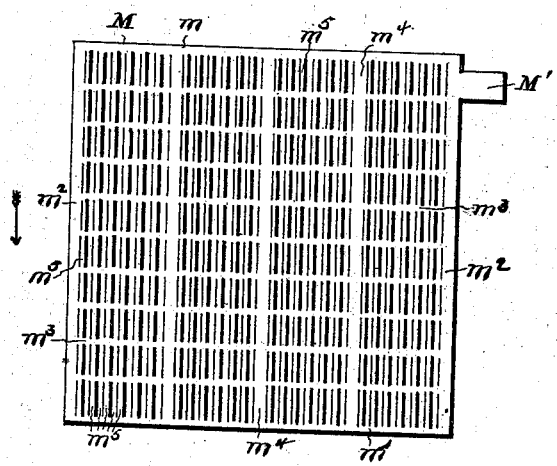
Figure 13:
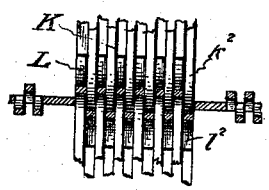
Figure 14:
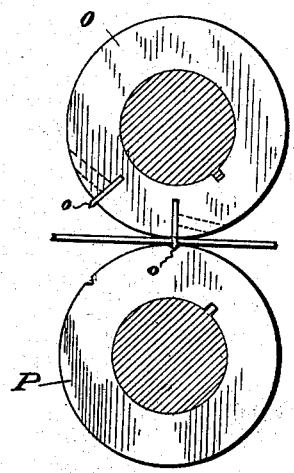
Figure 15:
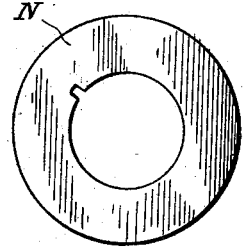

Figure 1 is a side elevation of a machine for cutting and swaging sheet metal embodying my improvements. Fig. 2 is an end elevation of the same. Fig. 3 is a cross-section on the line $x\ x$ of Fig. 1. Fig. 4 is a face view of one of the cutting and swaging disks detached. Fig. 5 is a face view of one of the spacing-disks detached. Fig. 6 is a face view of the cutter-disk for trimming one of the edges of the plate. Fig. 7 is an edge view of the same. Fig. 8 is a face view of one of the lug-cutting disks. Fig. 9 is an edge view of the same. Fig. 10 shows the longer roll-shaft detached. Fig. 11 is a similar view of the shorter roll-shaft. Fig. 12 is a plan view of a plate formed by the machine. Fig. 13 is an enlarged transverse sectional view of a part of the plate, parts of the cutting and swaging devices being represented in the act of forming the short alternately-bent bars of the plate. Fig. 14 is a sectional view illustrating the cutters which form the lugs $M'$. Fig. 15 is a face view of one of the idle disks or washers.

In the drawings the machine is shown as having a framework comprising standards or uprights $A\ A'$, a base-plate B, and one or more sills or joining-bars C; but as concerns the details of the framework there can be wide variation without departing from the essential features of the invention.

As shown, the standards $A\ A'$ are formed with upwardly-converging legs $a\ a'$ and the upper central bar $a^2$, this having two parallel parts $a^3\ a^3$, with a slot or open space $a^4$ between them provided with a guideway. In the guideways in the standards are fitted the bearing-blocks of the roll-shafts, the bearings of the lower shaft being shown at D and those of the upper shaft at $D'$. The upper shaft is indicated by E and the lower by F.

Each of these shafts is formed with a central part $e$, threaded parts $e'$ at the ends of the central part, and the journals at $e^2$. The journals are fitted in the said bearing-blocks $D\ D'$. The central parts $e$ are provided with keys or feathers G.

The lower shaft F has an extension $F'$, which is provided with a belt-wheel H and which has its outer end mounted in a supplemental standard $H'$. The two shafts are connected by gear-wheels $I\ I'$.

The upper shaft E can be adjusted and held in proper position by means of the screws $J\ J$, which pass through the ends of the top sill-bar C of the frame and bear against the upper sides of the bearing-blocks $D'$.

The cutting and swaging devices are attached to the shafts E and F.

K K indicate a series of disks. Each has a central aperture $k$ of the diameter of the part $e$ of the shaft. It also has a groove or recess $k'$, fitting the key or feather G, so that the disks can be readily slipped into place upon the shafts and arranged as desired. The periphery of each disk is scalloped—that is, provided with a series of projections $k^2$, each having a curvilinear edge of a radius shorter than that of the whole disk. Between the ends of these adjacent projections $k^2$ there are recesses $k^3$, these recesses being substantially equal in size, with the exception of one, (indicated by $k^4$,) which is considerably larger than the others. These cutting and swaging disks K are spaced apart by means of intervening disks L, whose peripheries are polygonal, the sides being shown at $l^2$, each having a central aperture $l$ and a groove or recess $l'$.

By referring to Fig. 12 it will be seen that the sheet of metal M, that results from the action of the machine, has what may be regarded as a marginal frame with bar-like portions $m\ m'$ at the top and bottom and vertical bar-like portions $m^2$, intermediate horizontal bar-like portions $m^3$, and intermediate vertical bar-like portions $m^4$. It will be also seen that these bar-like parts of the plate inclose a large number of sections or areas, wherein the plate has been cut into strips or minute bars $m^5$, parallel to each other and having their ends still remaining integral with the horizontal bar-like parts. The arrow upon the last said figure indicates the direction of travel of the plate as it goes through the machine. The machine cuts the strips or minute bars $m^5$ and presses or swages them up and down alternately. As shown, the areas of cutting and swaging extend in several series longitudinally of the plate and in several series transversely of the plate. The sections in each transverse series are separated one from the next by the bar-like parts $m^4$, above referred to, and the sections of each series longitudinally of the plate are separated one from the next by the bar-like parts $m^3$. To form these small strips or bars $m^5$, the disks K and L are placed in sets along the shafts E and F. One set is separated and spaced from the next set by means of idle disks or washers N.

It will be understood that each of the shafts E and F is provided with a series of sets of the disks K and L. The disks K of the first set on the shaft E overlap the disks on the shaft F, the plane of the face of one on the shaft E being as close as possible to the plane of the face of the next one on the shaft F. The two shafts are set so that the curved-edged projection $k^2$ of the disks K on the shaft E come radially opposite the projections $l^2$ on the disks L on the shaft F.

At the end of the shaft E there are placed one or more cutter-disks O. These disks are provided with cutters $o$ of such conformation as to form the lug M', projecting from the plate M. The shaft F is provided with disks P, opposite to the cutter-disks O, these having recesses which coact with the cutters $o$ with a shear-like action.

The cutters R operate to trim that edge of the plate from which extends the lug M'. As represented in Fig. 6 at $r$, the cutting edge is omitted from a portion of the periphery of the disk, and this cut-away or recessed portion of the disk $r$ is so disposed as to be in line with the portion of the disk O included between the cutters $o$. From this arrangement it will be seen that the disks R will shear the edge of the plate on either side of or up to the lug M' and that the cutters $o$ will sever the sheared portions of the plate from the edges of the lug.

By forming the cutting and swaging projections $k^2$ with their curvilinear edges formed on a radius shorter than that of the whole disk I insure that the short bars $m^5$ shall be bent outward gradually from either end, where they are connected with the transverse bar-like parts $m^3$ of the plate. If the swaging edge of these projections were concentric with the axis of the disk, the tendency would be to force the bars $m^5$ outward beyond the face of the plate to as great an extent at their ends where they unite with the transverse bar-like parts $m^3$ as at their middle portions, with the result that fracture of the bars would frequently take place. By making the spacing-disks L of the shape shown and described—that is, with the polygonal sides or faces $l^2$—the bending or swaging of the bars $m^5$, as just described, is facilitated.

The operation of a mechanism such as above described will be readily understood. At present I use the machine principally in the manufacture of electrode-plates from sheet-lead. For such work it is used as follows: A sheet of lead of approximately the correct width is cut and then passed between the two sets of cutting and swaging devices on the shafts E and F. The sheet is of a length substantially equal to the periphery of the disks K. The entering edge of the plate or sheet is not cut, for at that time the wider peripheral recesses $k^4$ in the disks K are opposite to the said edge, and it passes between the disks without action; but in an instant the projecting parts $k^2$ of the disks come around to where those carried by the shaft E engage with and press down upon the top surface of the lead sheet, and those carried by the shaft F engage with and press up against the bottom face of the sheet, and that section of the lead which is then opposite to these sections is cut into the narrow strips or bars $m^5$, and the latter are curved, bent, or bowed, some upward and the alternate ones downward. Shortly thereafter the recessed parts $k^3$ of the disks come opposite to the lead sheet and the cutting and swaging action ceases, and the result is the forming of one of the bar-like parts $m^3$ in the sheet. These steps continue as often as the successive sets of projections $k^2$ come into contact with the lead during a revolution of the shafts E and F. Just before such revolution terminates the wide peripheral recesses $k^4$ again come around and insure that the last edge of the sheet that passes through the rolls shall be left untouched, so that the bar-like part $m$ of the frame is provided in the sheet. As the sheet is passing through the rolls horizontal bar-like parts at $m^3$ are produced, or rather are left uncut, and the edge cutters at R, O, and P properly trim and shape edge of the plate and form the lug M'.

With a mechanism of this sort I have been able to greatly reduce the cost of the manufacture of electrode-plates or accumulators for storage batteries. The cutting and bending devices can be so arrranged as to expose a large extent of surface of the lead, so that the entire mass becomes active. The oppositely-bent bars or strips $m^5$ not only permit the circulation of the electrolyte with the utmost freedom, but form large pockets, cavities, or chambers wherein granular or paste-like active materials can be packed to increase the efficiency of the plates. The parts of the lead plate, which as an entirety can be regarded as the parts of a common frame, are so related to each other that bending or warping is entirely obviated. The shapes of the cutting and swaging parts of the machine can be made such that the bar-like parts $m\ m'\ m^2\ m^3\ m^4$ can be reduced to the minimum in width, only that width being necessary which will insure sufficient strength for the supporting parts of the plate.

I have above described in detail the parts which I at present prefer to use in constructing the machine; but of course it will be understood that there can be modifications. When the two shafts have been provided with their several parts and the latter have been clamped in position by the nuts at Q, it will be seen that they constitute two roll-like devices, each having a series of sets of dies or die-disks, and some parts of the invention could be retained even if the cutting and pressing or swaging devices were formed from a solid piece of metal, the present construction, however, being cheaper and easier to keep in repair. The shafts constitute carriers for the working parts. The disks being slotted and fitted to the keys on the shafts are prevented from turning on the latter.

The dimensions shown are such as are used for producing an electrode-sheet at each revolution of the shafts; but they may be varied so as to produce two, three, or more sheets at each revolution, and longitudinally-arranged knives can be employed for severing the sheets successively from a continuous strip.

What I claim is—

1. In a machine for forming strips or bars in sheet metal, the combination of a series of rotary dies each having a series of metal-bending projections on its periphery adapted to press against one face of the metal, an opposing series of rotary dies having projections entering between and immediately against the projections of the first dies, and flat anvil-like surfaces between the said projections of each series of dies against which the opposing projections are adapted to act, substantially as set forth.

2. In a machine for forming strips or bars in sheet metal, the combination of a series of rotary dies each having a series of metal-bending projections on its periphery adapted to press against one face of the metal, an opposing series of rotary dies having projections entering between the projections of the first dies, and straight anvil-like surfaces between the said projections of each series of dies against which the opposing projections are adapted to act, said projections being shaped peripherally to have a rolling action on or near said surfaces, substantially as set forth.

3. A pair of opposing, similarly-speeded rolls similar in structure to each other, each roll having a series of die-disks, each disk having a series of peripheral dies, the dies of each disk plate being on the same lines, parallel to the axis, with the dies of the next disk plate, the operative periphery of each die being cycloid-like in contour, in combination with a series of abutment-washers, each washer being interposed between two of the die-plates and having flat abutment-surfaces, each die-plate on one roll being in radial planes immediately adjacent to the radial planes of a die-plate on the other roll, and each die being radially opposite one of the abutment-faces of a polygonal washer on the opposite roll, said parts being arranged substantially as described whereby the initial metal is from the first die to the last of a series, without interruption, formed into a row of loops, each loop extending in a direction opposite to the adjacent loops and the metal strip of each loop is formed without longitudinal strain, substantially as set forth.

4. In a machine for forming strips or bars in a sheet of metal, the combination of a roll-like device revolving on its longitudinal axis and having a series of sets of cutting and swaging dies, each die having a series of peripheral projections, and being spaced a distance from the next adjacent dies longitudinally of the roll-axis, rotary flat plane abutting devices for supporting the metal against the thrust of the said projections on the dies, and projections curved peripherally of such contour as to have a rolling action relative to said abutting devices for pressing the sheet metal adjacent to the dies toward their axis, substantially as set forth.

5. In a machine for forming electrode-plates from sheet metal, the combination of a pair of shafts, cutting and swaging devices carried thereby arranged to act upon opposite sides of the plate of metal and adapted to force curved and partly-severed strips of the metal outward from opposite sides of the plate, cutters R arranged near the ends of the shafts for trimming the edge of the sheet, the cutters being formed with the recesses or blank spaces r, and the cutters O, P, provided with coacting cutting members arranged in the direction of the axes of the shafts, and adjacent to the blank or recessed portions of the cutters R, the said cutters being to trim the edges of the plate and to form an outward-projecting lug thereon, substantially as set forth.

In testimony whereof I affix my signature in presence of two witnesses.

CHARLES W. KENNEDY.

Witnesses:
SAML. Z. HEELNER,
LOTTIE NUSBAUM.